(12) United States Patent
Iino et al.

(10) Patent No.: US 6,570,296 B1
(45) Date of Patent: May 27, 2003

(54) DRIVE MECHANISM WITH ULTRASONIC MOTOR AND ELECTRONIC DEVICE WITH ULTRASONIC MOTOR

(75) Inventors: Akihiro Iino, Chiba (JP); Makoto Suzuki, Chiba (JP); Masao Kasuga, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/696,788

(22) Filed: Oct. 26, 2000

(30) Foreign Application Priority Data

Nov. 1, 1999 (JP) .......................................... 11-311548

(51) Int. Cl.[7] ............................................... H02W 2/00
(52) U.S. Cl. ........................... 310/323.03; 310/323.02; 310/323.04
(58) Field of Search ................ 310/328, 323.02–323.04

(56) References Cited

U.S. PATENT DOCUMENTS

| 5,521,455 | A | * | 5/1996 | Miyazawa et al. | ..... 310/323.04 |
|---|---|---|---|---|---|
| 5,905,327 | A | * | 5/1999 | Ooi et al. | ............... 310/323.01 |
| 6,104,124 | A | * | 8/2000 | Suzuki et al. | ........... 310/323.04 |
| 6,304,513 | B1 | * | 10/2001 | Billon | ......................... 367/88 |
| 6,366,003 | B1 | * | 4/2002 | Kasuga et al. | ......... 310/316.02 |

FOREIGN PATENT DOCUMENTS

JP           10290579       * 10/1998      ............ H02N/2/00

* cited by examiner

*Primary Examiner*—Nestor Ramirez
*Assistant Examiner*—Karen Addison
(74) *Attorney, Agent, or Firm*—Adams & Wilks

(57) ABSTRACT

A drive mechanism has an ultrasonic motor having a rotor which is rotationally driven by vibration of a vibrating member having a piezoelectric element. The rotor has a projecting portion for rotation therewith. A driven member is connected to the rotor for undergoing movement along a surface extending in a radial direction of the rotor. A guide member restricts movement of the driven member and guides movement of the receiving member in a given direction. A receiving member contacts the projecting portion of the rotor to limit a range of rotation of the rotor and limit a range of movement of the driven member.

22 Claims, 5 Drawing Sheets

DRIVE MECHANISM WITH ULTRASONIC MOTOR AND ELECTRONIC DEVICE WITH ULTRASONIC MOTOR

BACKGROUND OF THE INVENTION

1. Field of the Invention

The present invention relates to a drive mechanism with an ultrasonic motor, and to an electronic device using the drive mechanism with the ultrasonic motor.

2. Description of the Related Art

Generally, optical apparatuses have an aperture or shutter mechanism for controlling the quantity of introduced light. Such an aperture mechanism is designed to control the quantity of introduced light by moving aperture blades which cover the aperture. To drive the blades, an electromagnetic actuator or a stepping motor is ordinarily used in combination with any of various motive power transmission mechanisms using toothed wheels, etc.

Conventionally, from an output shaft attached to the rotor of such an electromagnetic actuator or a stepping motor with little driving force, motive power is transmitted through a complicated power transmission mechanism. The conventional drive mechanisms for the above-mentioned purpose are large in size and have low positioning resolution. With respect to shutters, there is a limit to the shutter opening/closing speed. In the case of an aperture mechanism or the like, there is a need to keep a current running for maintaining the mechanism stopped in a certain position. In particular, there is a problem of fast exhaustion of batteries in portable devices such as cameras and video camera-recorders relating to such a need.

Further, the conventional electromagnetic actuators or motors are liable to generate electromagnetic noise such as to seriously affect communication and medical apparatuses. Conversely, they are caused to malfunction in the presence of magnetic fields.

SUMMARY OF THE INVENTION

In view of the above-described circumstances, an object of the present invention is to provide a drive mechanism using an ultrasonic motor for directly driving a driven member without a transmission mechanism using toothed wheels or the like.

To achieve the above-described object, the present invention employs, an ultrasonic motor as an actuator which is small in size and thickness, having a large torque, a stationary torque and has improved response, and is insensitive to magnetism, and provides a drive mechanism with an ultrasonic motor comprising an ultrasonic motor having a vibrating member including a piezoelectric element, and a rotor capable of rotating by receiving vibration of the vibrating member, at least one driven member linked to the rotor and driven by being linked to a rotary motion of the rotor, a guide member for restricting the rotation of the driven member to guide the driven member in a direction in which the driven member is to be driven.

The rotor of the ultrasonic motor is in the form of a plate because of the essential qualities of the ultrasonic motor. Therefore, the driven member can be rotatably attached to portions of the rotor other than the rotary shaft.

In this aspect of the present invention, a guide member is provided on the outside of the rotor to movably guide the driven member so that the driven member does not rotates with the rotation of the rotor, thereby enabling the moving member to move separately from the rotary motion of the rotor.

According to the present invention, therefore, it is possible to provide a drive mechanism which uses an ultrasonic motor to directly drive a driven member without a transmission mechanism using toothed wheels or the like, which is small in size, and which has high positioning accuracy.

The rotor may be directly pressed against the piezoelectric element or may be pressed against the piezoelectric element with a vibrating member interposed therebetween, the vibrating member amplifying elliptical vibration caused by expanding vibration of the piezoelectric element.

According to the present invention, the above-described drive mechanism with the ultrasonic motor may comprise the projecting portion (e.g., rotation range limiting member 15b) provided on the rotor, and a receiving member (e.g., spring seat 16a) for limiting the range of rotation of the rotor and limiting the range of movement of the driven member by receiving the projecting portion coming to the receiving member by a turning movement.

In this case, since the range of rotation of the rotor is limited, the moving member is inhibited from moving so as to exceed allowable limits, so that reliability of the drive mechanism with the ultrasonic motor can be improved.

More specifically, according to the present invention, there are provided a pressing spring (e.g., a plate spring 16) for pressing at least one of the rotor and the piezoelectric element against the other so that the pressure for contact therebetween is increased, and a spring seat (16a) for holding the pressing spring. This spring seat is constructed to also function as a receiving member.

Specifically, the driven member is linked to the rotor through the projecting portion.

In the above-described drive mechanism with the ultrasonic motor, a cushioning material for absorbing a shock may be provided between the projecting portion and the receiving member, thereby reducing the possibility of such a shock at the time of receiving seriously affecting the device incorporating the drive mechanism with the ultrasonic motor.

According to the present invention, in the above-described drive mechanism (1) with the ultrasonic motor, the driving direction in which the driven member is guided by the guide member (19b) is a rectilinear direction.

According to the present invention, it is possible to provide a drive mechanism with an ultrasonic motor capable of directly converting a rotary motion of a rotor into a rectilinear motion of a driven member.

According to the present invention, a plurality of driven members may be driven in different directions to each other. More specifically, separate driven members (e.g., aperture blades 21) are attached to the same rotor at two positions, and are moved in opposite directions to each other.

According to the present invention, it is also possible to obtain a drive mechanism (2) with an ultrasonic motor in which each of two driven members has an aperture (21C), the two driven members are placed in an overlapping manner such that the aperture of one driven member is covered with the other driven member, and the amount of overlap of the two driven members is changed by rotational movement of the rotor to change the amount of opening (21d) of the aperture.

This mechanism can be used as an aperture mechanism for light quantity control or a shutter mechanism.

The present invention also provides a drive mechanism (3) with an ultrasonic motor comprising an ultrasonic motor having a vibrating member including a piezoelectric element, and a rotor capable rotating by receiving vibration of the vibrating member, a rotating member linked to the rotor and rotated by being linked to a rotary motion of the rotor, a driven member linked to the rotating member and driven with the rotation of said rotating member, and an axial member for rotatably supporting said driven member.

According to the present invention in this aspect, the driven member is a lever with the axial member and the rotor operating as a fulcrum and a point of action, respectively. Therefore, it is possible to provide, by utilizing the principle of the lever, a drive mechanism with an ultrasonic motor using a rotary motion of the drive mechanism rotor as a direct motive power source.

According to the present invention, it is also possible to obtain a drive mechanism with an ultrasonic motor comprising an aperture member (e.g., rotary member 31) having an aperture (31a), wherein the driven member is placed so that at least one portion overlaps the aperture of the aperture, and wherein the amount of overlap of the aperture and the driven member is changed with a rotational movement of the rotor to change the amount of opening of the aperture.

This mechanism can be used as an aperture mechanism for light quantity control or a shutter mechanism.

The present invention also provides a drive mechanism with an ultrasonic motor comprising an ultrasonic motor having a vibrating member including a piezoelectric element, and a rotor capable of being rotated by vibration of the vibrating member, a first driven member linked to the rotor and driven by being linked to a rotary motion of the rotor, a rotating member maintained in contact with the rotor and rotated by being linked to the rotary motion of the rotor, a second driven member linked to the rotating member and driven by being linked to the rotary motion of the rotating member, and an axial member for restricting the rotation of each of the first and second driven members and axially supporting the first and second driven members.

According to this aspect of the present invention, the two driven members can be used as hands for pinching and holding an object. Also, free end portions of the first and second driven members project toward each other and overlap with each other to have an overlap portion, and the amount of opening of the aperture (42e) formed by being surrounded by the first driven member and the second driven member is changed by a rotational movement of the rotor.

This mechanism can be further used as an aperture mechanism for light quantity control or a shutter mechanism.

The above-described drive mechanism with the ultrasonic motor may further be constructed to have rotation amount detection means (e.g., slit member 7 and light emitting and receiving device 16b) for detecting the amount of rotation of the rotor, and a control unit (18) for controlling the ultrasonic motor according to the amount detected by the rotation amount detection means.

In this case, since the ultrasonic motor is controlled by detecting the amount of rotation of the rotor, i.e., the amount of driving of the driven member, the drive mechanism with the ultrasonic motor can perform driving with improved accuracy.

This rotation amount detection means is, for example, a method of irradiating light on a slit member provided on the rotor, receiving transmitted light or reflected light obtained in a digital manner, and analyzing the number of pulses thereby obtained.

Further, the drive mechanism with ultrasonic motor may further be constructed to have a light quantity sensor for detecting the quantity of light passing through the aperture, and a control unit for changing the amount of opening of the aperture by controlling the ultrasonic motor according to the amount detected by the light quantity sensor. The amount of movement of the rotor is controlled while directly detecting the control-object light quantity, thus enabling highly accurate light quantity control.

The present invention also provides an electronic device with the ultrasonic motor having the above-described drive mechanism with the ultrasonic motor.

According to the present invention, the drive mechanism with the ultrasonic motor of the present invention is smaller and more accurate in positioning than the conventional drive mechanisms. Therefore, if the drive mechanism of the present invention is used, electronic devices, such as still cameras, video camera-recorders, electronic watches, measuring apparatuses, printers, printing machines, machine tools, robots, transfer apparatuses, and storage units, can be designed so as to reduce the overall size and the accuracy.

DESCRIPTION OF THE PREFERRED EMBODIMENTS

Embodiments of the present invention will be described in detail with reference to the accompanying drawings.

<First Embodiment>

Figure 1:
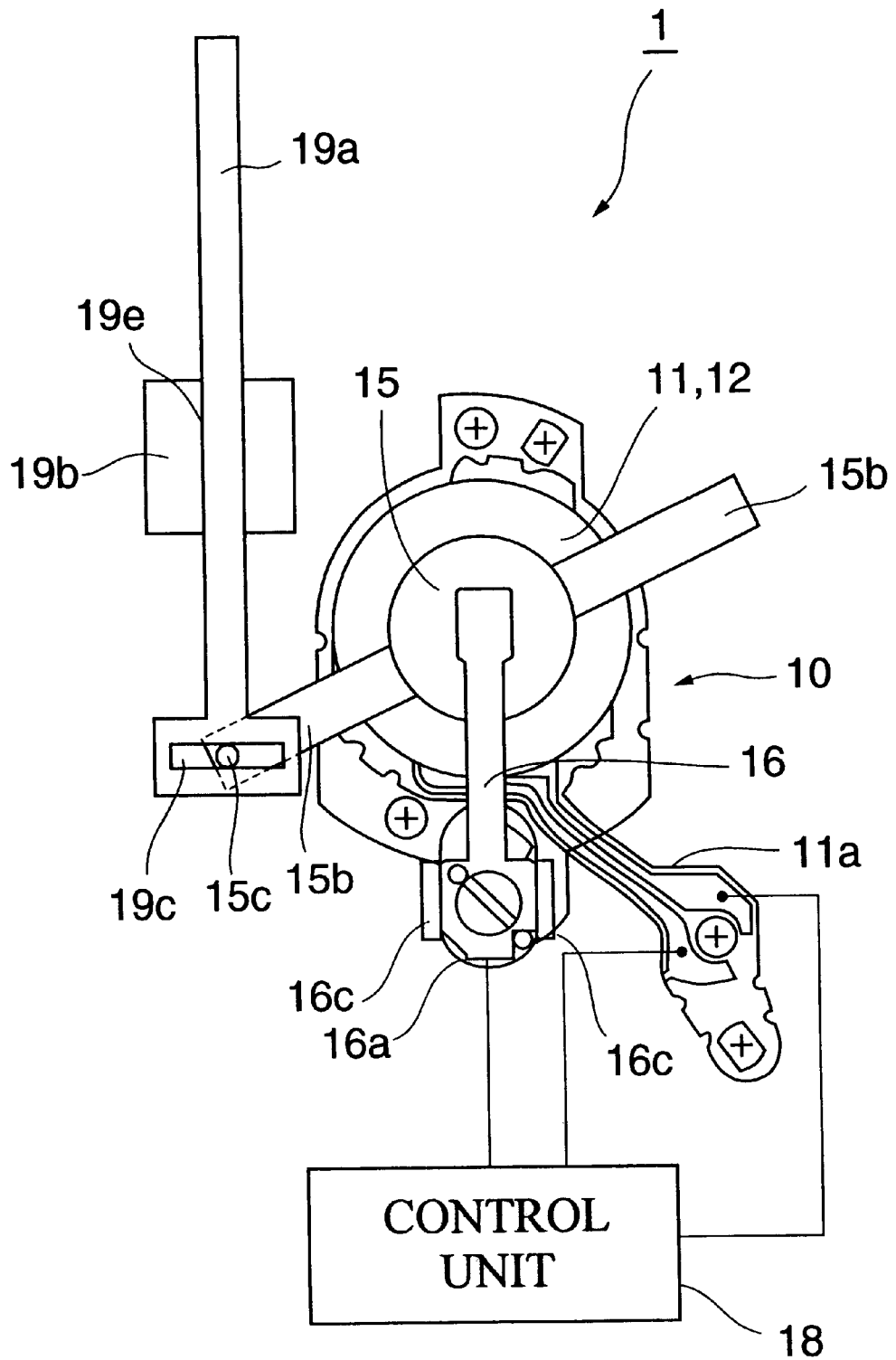
FIG. 1 is a schematic top view of the construction of a drive mechanism with an ultrasonic motor, which represents a first embodiment of the present invention.
Figure 2:
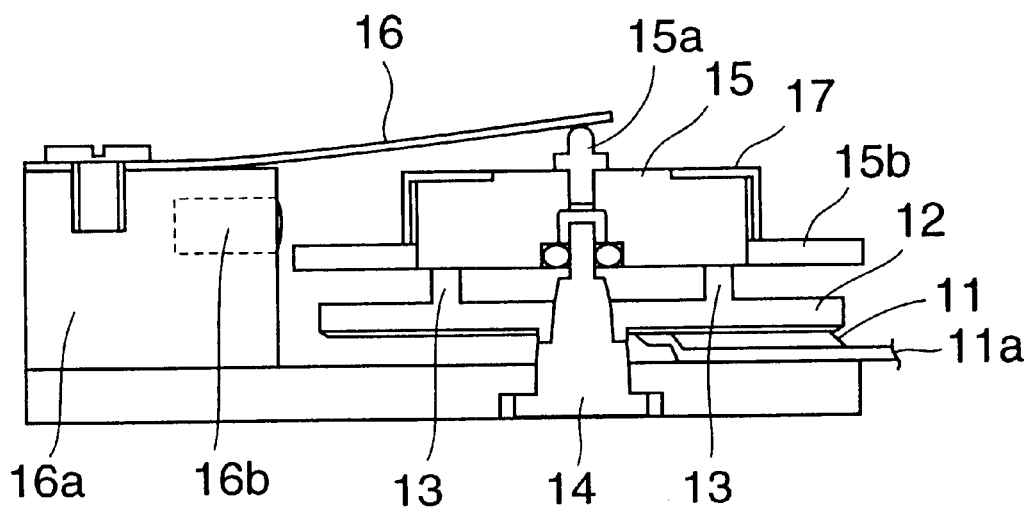
FIG. 2 is a schematic cross-sectional view of the ultrasonic motor of the drive mechanism with an ultrasonic motor shown in FIG. 1.

FIG. 1 is a schematic top view of the construction of a drive mechanism 1 with an ultrasonic motor 10, which represents a first embodiment of the present invention, and FIG. 2 is a schematic cross-sectional view of the construction of the ultrasonic motor 10 of the drive mechanism 1 with an ultrasonic motor.

The drive mechanism 1 is constituted essentially of the ultrasonic motor 10, a control unit 18 for controlling the ultrasonic motor 10, a drive rod 19a (driven member) linked rotatably to a rotor 15 of the ultrasonic motor 10, a guide member 19b which holds the driven member 19a in such manner that the driven member 19a is slidably fitted thereto.

As shown in FIGS. 1 and 2, the ultrasonic motor 10 is constituted essentially of a disklike piezoelectric element 11, a disklike vibrating member 12 fixed to the upper surface of the piezoelectric element 11, a plurality of projections 13 integrally provided on the upper surface of the vibrating member 12, a shaft 14 passing through central portions of the piezoelectric element 11 and the vibrating member 12, a disklike rotor 15 rotatably supported by the shaft 14, a plate spring 16 for pressing the rotor 15 against the projections 13, and lead wires 11a for transmitting drive signals to electrodes of the piezoelectric element 11.

The plate spring 16 has its one end fixed on a spring seat 16a spaced apart at a certain distance from the shaft 14, and has its other end maintained in contact with the uppermost end portion of a press-down member 15a, which protrudes beyond the upper surface of the rotor 15 at the center of the same, and which presses the rotor 15 downward. The uppermost end of the press-down member 15a is higher than the upper surface of the spring seat 16a, so that the plate spring 16 is bent.

The rotor 15 has a pair of rotation range limiting members 15b each projecting from its side surface along the circumference in a direction perpendicular to the axial direction of the shaft 14. The rotation range limiting members 15b are provided opposite from each other about the shaft 14. The projecting length of the rotation range limiting members 15b is long enough to enable each of the rotation range limiting members 15b to be brought into contact with the spring seat 16a when the rotor 15 rotates.

Contact sensors 16c are provided on side surfaces of the spring seat 16a. Each contact sensor 16c detects contact of the rotation range limiting member 15b, and outputs a contact signal to the control unit 18.

As shown in FIG. 2, a slit member 17 is provided along the side surface of the rotor 15. The slit member 17 is formed in such a manner that a plate having a plurality of slits arranged at regular intervals and having its one surface mirror-finished is wrapped around an outer side surface of a disk having a central opening, with the two end portions of the plate joined to each other, and with the mirror-finished surface facing outward. The slit member 17 is placed on the rotor 15 in a capping manner. That is, the slits in the silt member 17 are formed so as to cover the side surface of the rotor 15 at regular intervals.

The spring seat 16a is formed by providing a light emitting and receiving device 16b in an inner side surface of a well-known spring seat. The light emitting and receiving device 16b emits light such as laser light toward the slit member 17, receives reflected light from the slit member 17, and converts the received light into an electrical signal. As the rotor 15 rotates, the light emitting and receiving device 16b intermittently receives light, generates an electrical signal formed of pulses, and outputs the signal to the control unit 18.

That is, the control unit 18 computes the amount of rotation of the slit member 17, i.e., the amount of rotation of the rotor 15 from the number of pulses in the electrical signal supplied from the light emitting and receiving device 16b and the total number of slits in the slit member 17, controls the ultrasonic motor 10 while recognizing the computed amount of rotation, and stops the ultrasonic motor 10 when it receives a contact signal from the contact sensors 16c.

The drive rod 19a has a generally rectangular hole 19c formed at its one end so as to extend laterally as viewed in FIG. 1. A shaft 15c projecting upward from an upper surface end portion of the rotation range limiting member 15b is inserted in the hole 19c. Thus, the drive rod 19a is attached so as to be swingable relative to the hole 19c and so that the shaft 15c is movable in the hole 19c.

The guide member 19b is provided separately from the ultrasonic motor 10. The guide member 19b has a channel 19e in which a portion of the drive rod 19a is slidably fitted, and which supports the drive rod 19a.

In the above-described drive mechanism 1 with the ultrasonic motor 10, when the rotor 15 and the rotation range limiting members 15b of the ultrasonic motor 10 are rotated clockwise as viewed in FIG. 1, the drive rod 19a is thereby driven while being stopped from moving to the left or right as viewed in FIG. 1, since its one portion is fitted in the channel 19e. The drive rod 19a therefore moves in a direction along the channel 19e, i.e., upward as viewed in FIG. 1 while allowing the shaft 15c to move in the hole 19c. When the rotor 15 and the rotation range limiting members 15b are rotated counterclockwise as viewed in FIG. 1, the drive rod 19a moves downward as viewed in FIG. 1 by a similar action.

That is, the drive mechanism 1 with the ultrasonic motor 10 is a drive mechanism for directly converting a rotary motion of the ultrasonic motor 10 into a longitudinal motion of the drive rod 19a.

Thus, the small (thin) ultrasonic motor 10 having a high-precision positioning resolution and a stationary torque is used, and the power transmission mechanism is simplified in comparison with the conventional art, so that the size of the drive mechanism 1 with the ultrasonic motor 10 is small. If this drive mechanism is used, electronic devices having a mechanism for to-and-fro motions (still cameras, video camera-recorders, electronic watches, measuring apparatuses, printers, printing machines, machine tools, robots, transfer apparatuses, storage units, and so on) can be designed so as to reduce the overall size and the power consumption.

Since no toothed wheel is used for motive power transmission, the motive power transmission mechanism can operate with least play and can therefore position the drive rod 19a with improved accuracy.

Moreover, the control unit 18 controls the ultrasonic motor 10 while detecting the amount of rotation of the rotor 15 and the rotation range limiting members 15b, and stops the ultrasonic motor 10 when it receives a contact signal. Therefore, the control unit 18 can precisely control the ultrasonic motor 10 by stopping the motor accurately and without overshooting the target point. Consequently, there is no possibility of the drive rod moving excessively, the accuracy of positioning of the drive rod 19a is further improved, and the reliability of the drive mechanism 1 with the ultrasonic motor is also improved.

This embodiment can be modified as desired within the scope of the present invention.

For example, if a through hole is formed in the guide member 19b instead of the channel 19e, and the drive rod 19a is slidably inserted in this through hole, the same drive function can also be performed.

Figure 3:
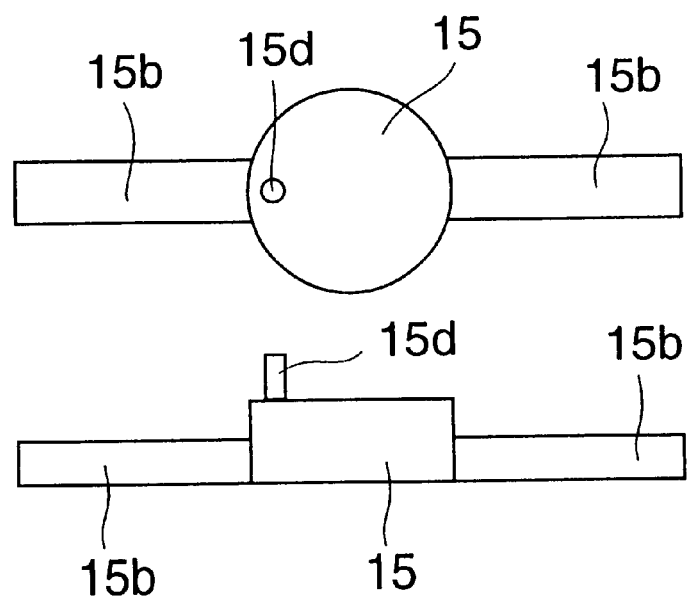
FIG. 3 comprises schematic top and side views for explaining a rotor used in an example of modification of the drive mechanism with an ultrasonic motor shown in FIG. 1.

Also, the arrangement may alternatively be such that, as shown in a schematic side view of FIG. 3, a projection 15d is provided on the upper surface of the rotor 15 and is inserted in the hole 19c of the drive rod 19a to drive the drive rod 19a. In this case, the drive mechanism is free from impact noise and also does not give a shock to the slide portions of the rotating member and the rotor of the ultrasonic motor, so that the life of the ultrasonic motor can be extended. Also, the elasticity of a cushioning material can produce a force in the rotor driving direction, thereby improving the mobility of the ultrasonic motor.

Cushioning members may be attached instead of the contact sensors 16c to absorb a shock when one of the rotation range limiting members 15b is brought into contact with the spring seat 16a, thereby avoiding a detrimental effect on the device incorporating the drive mechanism with the ultrasonic motor.

<Second Embodiment>

A drive mechanism 2 with an ultrasonic motor, which represents a second embodiment of the present invention, will next be described in detail with reference to FIGS. 4 and 5.

Figure 4:
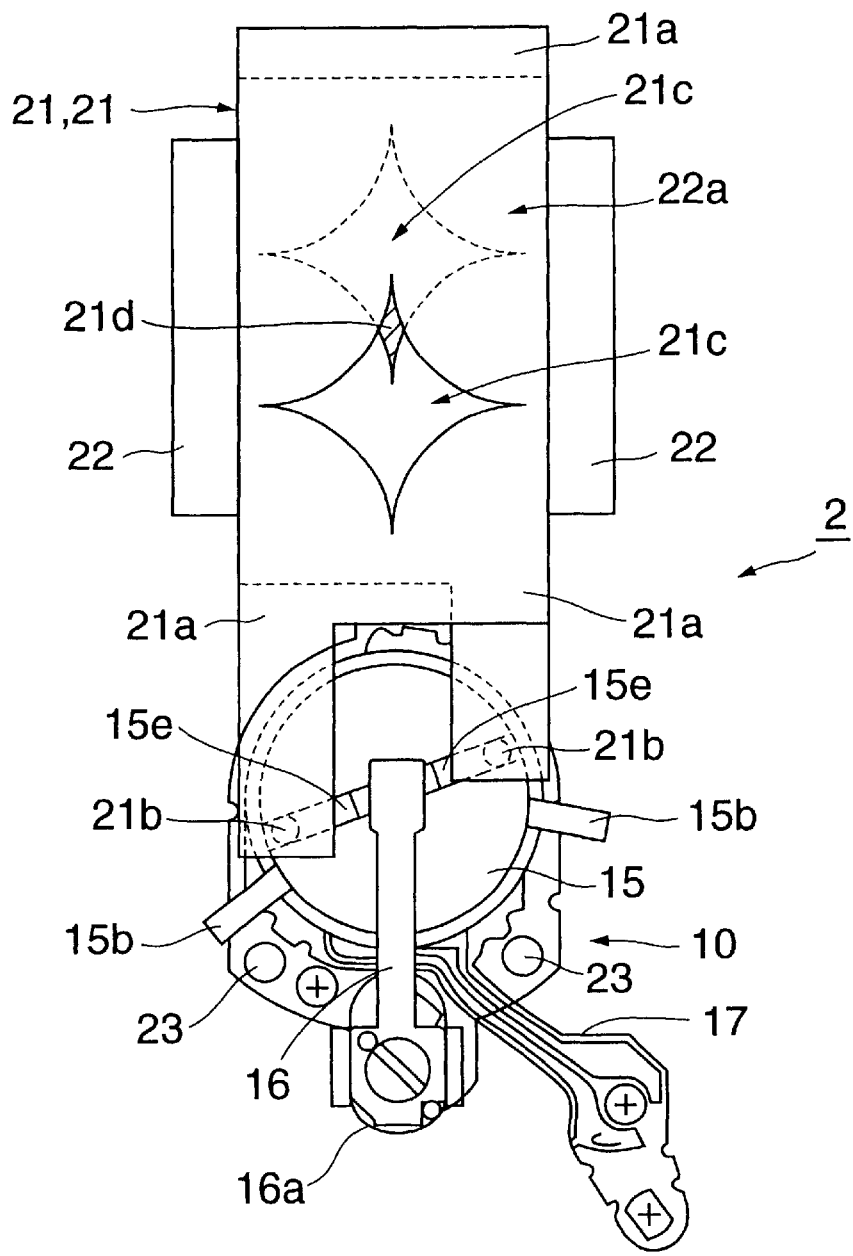
FIG. 4 is a schematic top view of a drive mechanism with an ultrasonic motor, which represents a second embodiment of the present invention.
Figure 5:
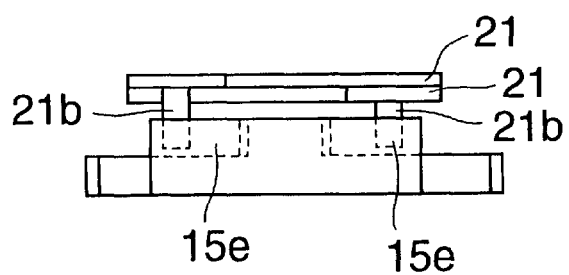
FIG. 5 is a schematic side view of an essential portion of the drive mechanism with an ultrasonic motor shown in FIG. 4.

FIG. 4 is a schematic top view showing the construction of the drive mechanism 2 with an ultrasonic motor, and FIG. 5 is a schematic side view of an essential portion of the drive mechanism 2 with an ultrasonic motor.

The drive mechanism 2 with an ultrasonic motor is a drive mechanism used as an aperture or shutter mechanism for optical apparatuses represented by a camera. As shown in FIG. 4, the drive mechanism 2 with an ultrasonic motor is constituted essentially of an ultrasonic motor 10, two aperture blades 21 directly attached rotatably to a rotor 15 of the ultrasonic motor 10, and a guide member 22 in which the aperture blades 21 are slidably fitted, and which supports the aperture blades 21.

In this embodiment, the attached positions of two rotation range limiting members 15b of the rotor 15 are spaced apart by an angle of, for example, about 150° along the circumference of the rotation range limiting members 15b, and stop pins 23 (receiving members) for limiting the range of rotation of the rotor 15 in association with the rotation range limiting members 15b are provided separately from a spring seat 16a on both sides of the spring 16a of the ultrasonic motor 10.

Further, the rotor 15 has generally rectangular holes 15e extending in opposite radial directions from the vicinity of a shaft 14 so as to be symmetrical about the shaft 14, respectively.

Each aperture blade 21 is formed of a rectangular plate 21a having a width approximately equal to the diameter of the ultrasonic motor 10 and having its one corner portion extended along its longitudinal direction. A shaft 21b is provided on the extended portion in the end thereof. The rectangular plate 21a has an aperture 21c formed at its center portion.

As shown in FIGS. 4 and 5, the two aperture blades 21 have their shafts 21b respectively inserted in the separate holes 15e. Thus, the two aperture blades 21 are attached so as to be swingable relative to the holes 15e and movable in the holes 15e. Since the aperture blades 21 are attached so as to have a symmetry about a line, the rectangular plates 21a are superposed one on another.

The guide member 22 is provided separately from the ultrasonic motor 10. For example, the guide member 22 slidably supports only opposite side surfaces of the rectangular plates 21a of the two aperture blades 21.

In the thus-constructed the drive mechanism 2 with the ultrasonic motor, each of the two aperture blades 21 moves by the same action as that of the above-described drive rod 19a in the drive mechanism 1 with the ultrasonic motor. While one of the two aperture blades 21 is moving upward as viewed in FIG. 4, the other is moving downward as viewed in FIG. 4.

According to the direction of rotation of the rotor 15, the overlap portion of the two rectangular plates 21a becomes larger and becomes smaller. When the overlap portion of the rectangular plates 21a becomes larger, the amount of overlap of the apertures 21c, i.e., the amount of opening 21d becomes larger. Conversely, when the overlap portion of the rectangular plates 21a becomes smaller, the overlap of the apertures 21c, i.e., the amount of opening 21d becomes smaller.

That is, the drive mechanism 2 with the ultrasonic motor 10 is capable of adjusting the amount of opening 21d by controlling the amount rotation and the direction of rotation of the rotor 15 through the drive of the ultrasonic motor 10. Therefore, the drive mechanism 2 with the ultrasonic motor can be used as an aperture mechanism. If the rotor 15 is rapidly moved, the drive mechanism 2 with the ultrasonic motor can be used as a shutter mechanism. Specifically, by using the ultrasonic motor 10 having improved response, a shutter having a markedly high opening/closing speed can be realized.

Thus, the ultrasonic motor 10 having a reduced size (thickness) is used in combination with the motive power transmission mechanism simpler than the conventional ones, so that the accuracy with which the aperture blades 21 are positioned is high and the size of the drive mechanism 2 with the ultrasonic motor 10 is small. If this drive mechanism is used in an electronic device such as a camera, the overall size of the electronic device can be reduced.

If the drive mechanism 2 with the ultrasonic motor according to this embodiment is used in an automatic focusing (AF) camera, the amount of light passing through the drive mechanism 2 with the ultrasonic motor may be detected by the light quantity detection means used in combination with the automatic focusing mechanism, and the control unit 18 may control the drive mechanism 2 with the ultrasonic motor by recognizing the amount of opening 21d from the detected quantity of light.

<Third Embodiment>

Figure 6:
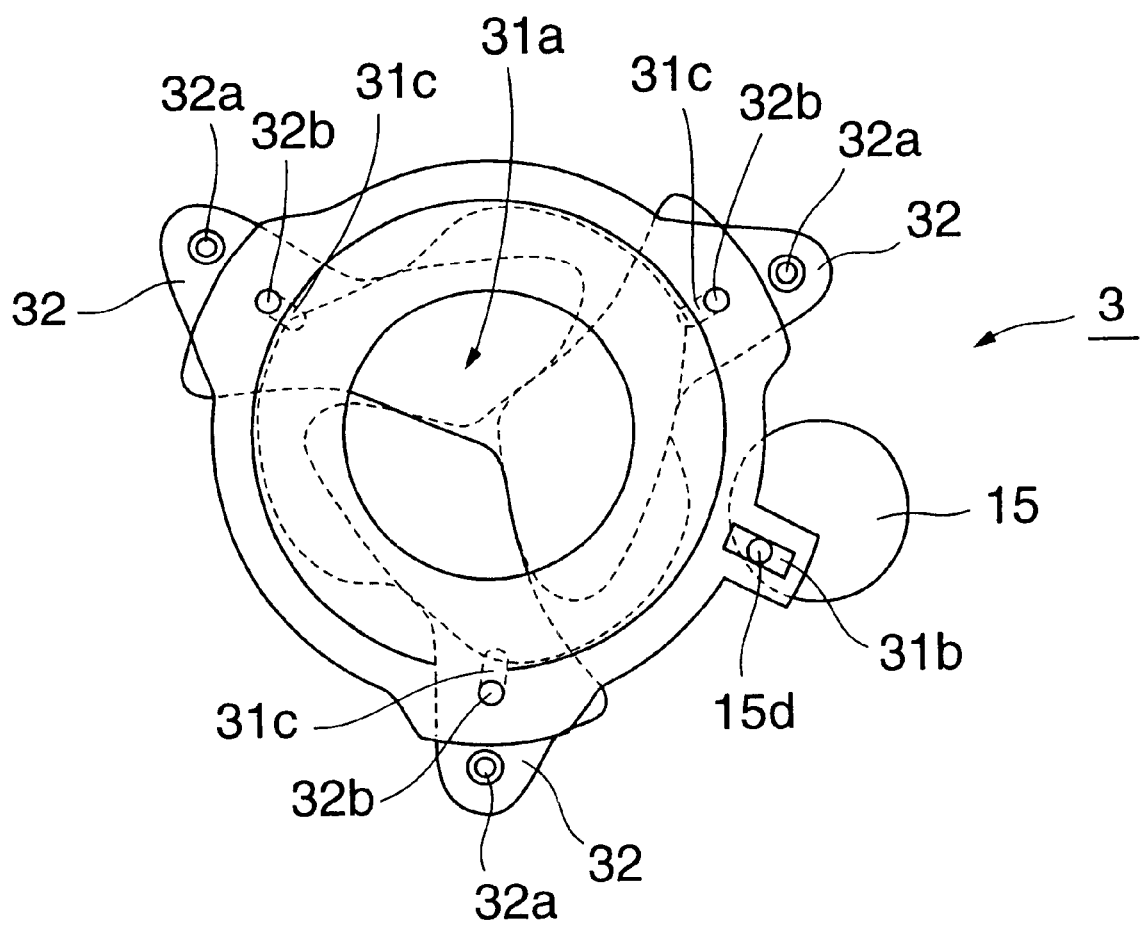
FIG. 6 is a schematic top view explaining a drive mechanism with an ultrasonic motor, which represents a third embodiment of the present invention.

A drive mechanism 3 with an ultrasonic motor, which represents a third embodiment of the present invention, will be described in detail with reference to the schematic top view of FIG. 6.

The drive mechanism 3 with an ultrasonic motor is, for example, a mechanism used as an aperture or shutter mechanism for a camera. The drive mechanism 3 with an ultrasonic motor is constituted essentially of an ultrasonic motor 10 (of which only rotor 15 is shown in FIG. 6), a ring-shaped rotary member 31 having an aperture 31a for introduction of light formed at its center, and three aperture blades 32 (driven members) for covering the aperture 31a to adjust the amount of opening thereof.

The rotary member 31 has a generally rectangular hole 31b formed in its peripheral portion so as to extend in a radial direction, and also has, for example three generally rectangular holes 31c formed in its inner peripheral portions so as to extend in radial directions while being spaced apart from each other by an angle of 120°. The hole 31b is a hole in which the projection 15d on the upper surface of the rotor 15 is to be inserted fromlbelow. The holes 31c are holes in which projections 32b of the aperture blades 32 described below in detail are to be inserted from below.

Each of three aperture blades 32 is swingably attached at its one end to a component (not shown) other than the rotor 15 and the rotary member 31 by using its shaft 32a. The three aperture blades 32 are attached in this manner at three positions located outside the rotary member 31 and spaced part from each other by 120°. Also, each aperture blade 32 has, at a position close to its center, the projection 32b to be inserted to the hole 31c.

That is, the rotary member 31 is rotatably positioned on the shaft 32a through the aperture blades 32.

The other ends of the three aperture blades 32 are placed so as to cover the aperture 31a of the rotary member 31.

In the thus-constructed drive mechanism 3 with the ultrasonic motor, when the rotor 15 of the ultrasonic motor 10 rotates, the rotary member 31 rotates while allowing the projection 15d to slide in the hole 31b. As the rotary member 31 rotates, the aperture blades 32 moves swingably on the shafts 32a while sliding the projections 32b in the holes 31b, thereby changing the amount of covering over the aperture 31a. So that, the amount of opening of the aperture 31a is thereby changed. The direction of swing of the aperture blades 32 to increase or reduce the amount of opening of the aperture 31a is determined by the direction of rotation of the rotor 15.

That is, the drive mechanism 3 with the ultrasonic motor is capable of adjusting the amount of opening,of the aperture 31a by rotating the rotor 15. Therefore, it can be used as a camera aperture mechanism. If the shape and the attached positions of the aperture blades 32 are suitably selected, the aperture 31a can be completely covered with the blades 32. Therefore, the drive mechanism 3 with the ultrasonic motor can be used as a shutter.

Thus, the ultrasonic motor 10 having a reduced size (thickness), capable of high-precision positioning and having a stationary torque is used in an electronic device in combination with the motive power transmission mechanism simpler than the conventional ones, so that the accuracy with which the aperture blades 32 are positioned is high and the size of the drive mechanism 3 with the ultrasonic motor 10 is small. If this drive mechanism is used, the size and the power consumption of electronic devices, such as still cameras, video camera-recorders, robots having a charge-coupled device (CCD) camera, and measuring apparatuses can be reduced.

If the drive mechanism 3 with the ultrasonic motor according to this embodiment is used in an AF camera, the amount of light passing through the drive mechanism 3 with the ultrasonic motor may be detected by the light quantity detection means used in combination with the automatic focusing mechanism, and the control unit 18 may control the drive mechanism 3 with the ultrasonic motor by recognizing the amount of opening of the aperture 31a from the detected quantity of light.

<Fourth Embodiment>

Figure 7:
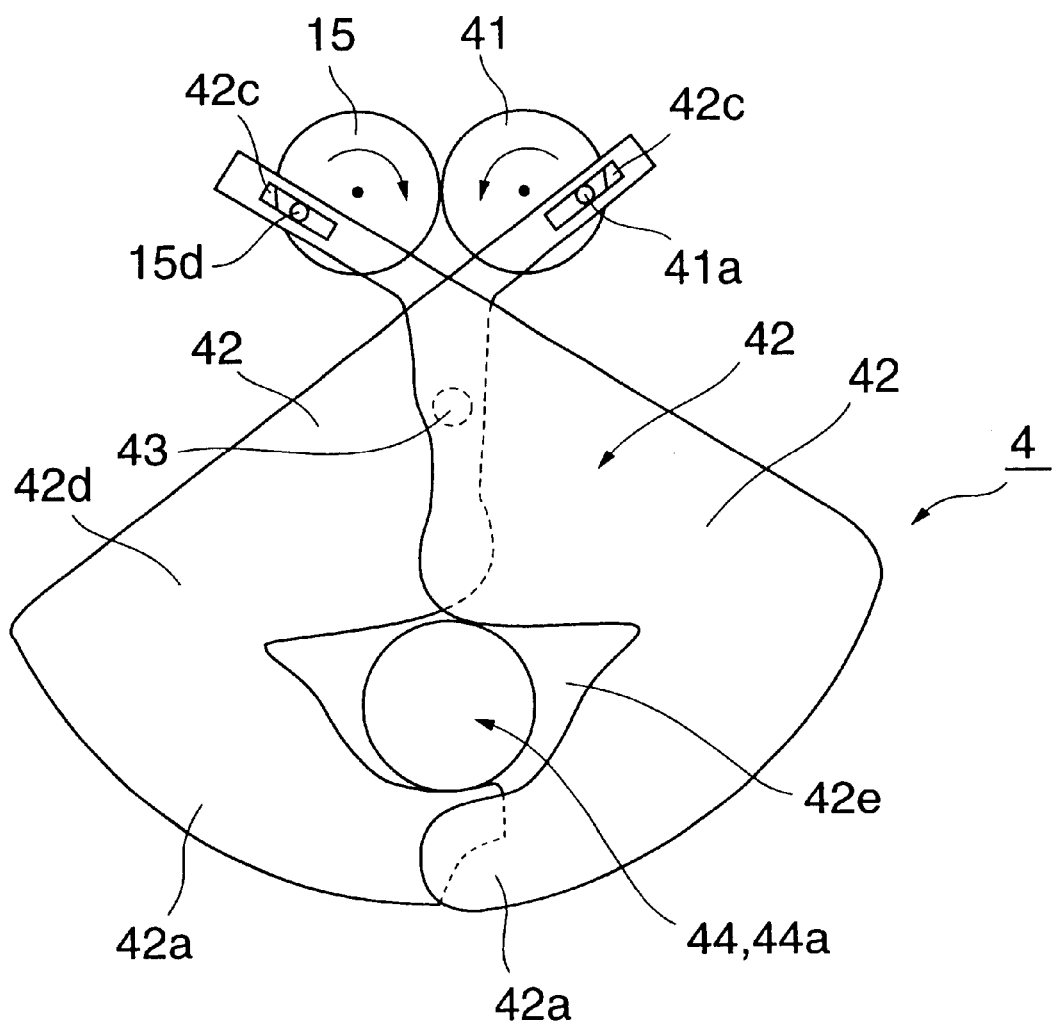
FIG. 7 is a schematic top view explaining a drive mechanism with an ultrasonic motor, which represents a fourth embodiment of the present invention.

A drive mechanism 4 with an ultrasonic motor, which represents a fourth embodiment of the present invention, will be described in detail with reference to the schematic top view of FIG. 7.

The drive mechanism 4 with an ultrasonic motor is constituted essentially of an ultrasonic motor 10, a disklike rotary member 41 having a side surface maintained in contact with a side surface of a rotor 15 of the ultrasonic motor 10, and therefore capable of rotating with the rotation of the rotor 15, aperture blades 42 (driven members) respectively attached to the rotor 15 and the rotary member 41 so as to be swingable and unidirectionally movable, and a shaft 43 for swingably positioning both the aperture blades 42.

The rotor 15 and the rotary member 41 are equal in outside diameter and have equal amounts of rotation. The rotary member 41 has a projection 41a on its upper surface. The projection 41a is provided at such a position that the projection 41a and the projection 15d of the rotor 15 exhibit a point symmetry. The projection 41a and the projection 15d are inserted in holes 42c of the aperture blades 42 described below in detail.

Each of the two aperture blade 42 is generally L-shaped. The aperture blades 42 are attached in such a manner that one of them is flipped from side to side so that the extreme ends of their lower side portions 42a overlap each other. Further, each aperture blade 42 has a generally rectangular hole 42c formed neat the upper end of a vertical side portion 42b so as to extend in the vertical direction as viewed in the shape of L. As mentioned above, the projections 15d and 41a are inserted in the holes 42c to attach the aperture blades 42 so that the aperture blades 42 are swingable and the projections 15d and 41d are movable in the holes 42c.

Central portions of the vertical side portions 42b project in the same direction as the lower side portions 42a and overlap each other. Through these overlapping portions 42d, the aperture blades 42 are swingably positioned on the shaft 43.

That is, the lower side portions 42a and the overlapping portions 42d of the two aperture blades 42 form an aperture 42e.

In the thus-constructed drive mechanism 4 with the ultrasonic motor, when the rotor 15 of the ultrasonic motor 10 is rotated, the rotary member 41 rotates in the direction opposite to the direction of rotation of the rotor 15. As the rotor 15 and the rotary member 41 rotate, the two aperture blades 42, positioned by the shaft 43, swing in opposite directions while allowing the projections 15d and 41a to slide in the holes 42c, thereby changing the amount of opening of the aperture 42e. The direction of swing of the aperture blades 42 to increase or reduce the amount of opening of the aperture 42e is determined by the direction of rotation of the rotor 15.

That is, the drive mechanism 4 with the ultrasonic motor is capable of adjusting the amount of opening of the aperture 42e by rotating the rotor 15. Therefore, it can be used as a camera aperture mechanism by placing a member 44 having a circular aperture 44a so as to overlap the aperture 42e. If the shape and the attached positions of the aperture blades 42 are suitably selected, the aperture 44a can be completely covered with the blades 42. Therefore, the drive mechanism 4 with the ultrasonic motor can be used as a shutter. Specifically, by using the ultrasonic motor 10 having improved response, a shutter having a markedly high opening/closing speed can be realized.

Thus, the ultrasonic motor 10 having a reduced size (thickness) and having a high-precision positioning resolution and a stationary torque is used in combination with the motive power transmission mechanism simpler than the conventional ones, so that the accuracy with which the aperture blades 42 are positioned becomes high and the size of the drive mechanism 4 with the ultrasonic motor 10 becomes small. The size and the power consumption of electronic devices such as cameras can be reduced by using this drive mechanism.

If the drive mechanism 4 with the ultrasonic motor according to this embodiment is used in an AF camera, the amount of light passing through the drive mechanism 4 with the ultrasonic motor may be detected by the light quantity detection means used in combination with the automatic focusing mechanism, and the control unit 18 may control the drive mechanism 4 with the ultrasonic motor by recognizing the amount of opening of the aperture 42e from the detected quantity of light.

In this embodiment, the rotary member 41 and the rotor 15 are maintained in contact with each other and a motion of the rotor 15 is converted into a motion of the rotary member 41 by frictional power transmission. However, any other transmission mechanisms using a belt, a cam, toothed wheels, or the like may alternatively be used.

According to the present invention, as described above, it is possible to provide a smaller drive mechanism which uses an ultrasonic motor to directly drive a driven member without a transmission mechanism using toothed wheels or the like, and which has a high positioning accuracy.

The range of rotation of the rotor is limited to inhibit the moving member from moving so as to exceed allowable limits, so that reliability of the drive mechanism with the ultrasonic motor can be improved.

Also, the possibility of a receiving a shock seriously affecting the device incorporating the drive mechanism with the ultrasonic motor can be reduced.

It is also possible to provide a drive mechanism with an ultrasonic motor capable of directly converting a rotary motion of a rotor into a rectilinear motion of driven members, and enabling the driven members to be used as an aperture for controlling the quantity of light.

A driven member can be a lever with a guide member and a rotor-operating as a fulcrum and a point of action, respectively. Therefore, it is possible to provide, by utilizing the principle of the lever, a drive mechanism with an ultrasonic motor capable of being used as an aperture mechanism for light quantity control with rotary motions of a drive mechanism rotor directly used as a motive power source.

Further, two driven members can be used as hands for pinching and holding an object, and also can be used as aperture members for light quantity control.

The ultrasonic motor is controlled by detecting the amount of rotation of the rotor, i.e., the amount of driving of the driven member, so that the drive mechanism with the ultrasonic motor can perform driving with improved accuracy.

The drive mechanism with the ultrasonic motor of the present invention is smaller than the conventional drive mechanisms. Therefore, if the drive mechanism of the present invention is used, electronic devices, such as still cameras, video camera-recorders, electronic watches, measuring apparatuses, printers, printing machines, machine tools, robots, transfer apparatuses, and storage units, can be designed so as to reduce the overall size and the power consumption.

What is claimed is:

1. A drive mechanism comprising:
    an ultrasonic motor having a rotor which is rotationally driven by vibration of a vibrating member having a piezoelectric element, the rotor having a projecting portion for rotation therewith;
    at least one driven member connected to the rotor for undergoing movement along a surface extending in a radial direction of the rotor;
    a guide member for restricting movement of the driven member and for guiding movement of the driven member in a given direction; and
    a receiving member for contacting the projecting portion of the rotor to limit a range of rotation of the rotor and limit a range of movement of the driven member.

2. A drive mechanism according to claim 1; further comprising a pressing spring for applying pressure to the rotor and the vibrating member to maintain the rotor and the vibrating member in contact with each other; and a spring seat for supporting the pressing spring; wherein the spring seat has the receiving member.

3. A drive mechanism according to claim 1; further comprising a cushioning material disposed between the projecting portion of the rotor and the receiving member.

4. A drive mechanism according to claim 1; wherein the given direction in which the movement of the driven member is guided comprises a rectilinear direction.

5. An electronic device having the drive mechanism according to claim 1.

6. A drive mechanism comprising:
    an ultrasonic motor having a rotor which is rotationally driven by vibration of a vibrating member having a piezoelectric element, the rotor having a projecting portion for rotation therewith;
    at least one driven member connected to the projecting portion of the rotor for undergoing movement along a surface extending in a radial direction of the rotor; and
    a guide member for restricting movement of the driven member and for guiding movement of the driven member in a given direction.

7. A drive mechanism according to claim 6; wherein the given direction in which the movement of the driven member is guided comprises a rectilinear direction.

8. A drive mechanism according to claim 6; wherein the at least one driven member comprises a plurality of driven members for undergoing rotation in different directions to each other.

9. A drive mechanism comprising:
    an ultrasonic motor having a rotor which is rotationally driven about a rotational axis by vibration of a vibrating member having a piezoelectric element;
    a rotational member connected to the rotor for rotation therewith about a rotational axis disposed generally parallel to the rotational axis of the rotor;
    an aperture member having an aperture;
    a driven member connected to the rotational member for rotation therewith and overlapping the aperture of the aperture member, an amount of overlap of the aperture by the driven member being varied by rotational movement of the rotor to change an amount of opening of the aperture; and
    an axial member rotatably supporting the driven member.

10. A drive mechanism according to claim 9; wherein the drive mechanism comprises one of an aperture mechanism for light quantity control or a shutter mechanism.

11. A drive mechanism according to claim 10; further comprising a light quantity sensor for detecting a quantity of light passing through the aperture, and a control unit for changing the amount of opening of the aperture by controlling the ultrasonic motor in accordance with the quantity of light detected by the light quantity sensor.

12. An electronic device having the drive mechanism according to claim 9.

13. An electronic device having the drive mechanism according to claim 6.

14. A drive mechanism comprising:
    an ultrasonic motor having a rotor which is rotationally driven about a rotational axis by vibration of a vibrating member having a piezoelectric element;
    a first driven member connected to the rotor for rotation therewith, the first driven member having a free end portion;
    a rotational member connected to the rotor for rotation therewith about a rotational axis disposed generally parallel to the rotational axis of the rotor; and
    a second driven member connected to the rotational member for rotation therewith, the second driven member having a free end portion projecting toward and overlapping the free end portion of the first driven member to selectively form an aperture, an amount of opening of the aperture being varied by a rotational movement of the rotor.

15. A drive mechanism according to claim 14; wherein the drive mechanism comprises one of an aperture mechanism for light quantity control or a shutter mechanism.

16. A drive mechanism according to claim 10; further comprising a light quantity sensor for detecting a quantity of light passing through the aperture, and a control unit for changing the amount of opening of the aperture by controlling the ultrasonic motor in accordance with the quantity of light detected by the light quantity sensor.

17. An electronic device having the drive mechanism according to claim 14.

18. A drive mechanism comprising:
an ultrasonic motor having a rotor which is rotationally driven by vibration of a vibrating member having a piezoelectric element, the rotor having a projecting portion for rotation therewith; at least one driven member connected to the rotor for undergoing movement along a surface extending in a radial direction of the rotor; a guide member for restricting movement of the driven member and for guiding movement of the driven member in a given direction; a receiving member for contacting the projecting portion of the rotor to limit a range of rotation of the rotor and limit a range of movement of the driven member; rotation amount detection means for detecting an amount of rotation of the rotor; and a control unit for controlling the ultrasonic motor in accordance with the rotation amount detected by the rotation amount detection means.

19. A drive mechanism comprising:
an ultrasonic motor having a rotor which is rotationally driven by vibration of a vibrating member having a piezoelectric element; a rotational member connected to the rotor for rotation therewith about a rotational axis extending in a radial direction of the rotor; an aperture member having an aperture; a driven member connected to the rotational member for rotation therewith and overlapping the aperture of the aperture member, an amount of overlap of the aperture by the driven member being varied by rotational movement of the rotor to change an amount of opening of the aperture; an axial member rotatably supporting the driven member; rotation amount detection means for detecting an amount of rotation of the rotor; and a control unit for controlling the ultrasonic motor in accordance with the rotation amount detected by the rotation amount detection means.

20. A drive mechanism comprising: an ultrasonic motor having a rotor which is rotationally driven by vibration of a vibrating member having a piezoelectric element, the rotor having a projecting portion for rotation therewith; a plurality of driven members connected to the rotor for undergoing movement in different directions to one another along a surface extending in a radial direction of the rotor, a preselected one of the driven members having an aperture, the driven members being disposed in overlapping relation to one another to cover the aperture, and the overlap of the driven members is changed by rotational movement of the rotor to change the amount of opening of the aperture; a guide member for restricting movement of the driven members and for guiding movement of the driven members in a given direction; a receiving member for contacting the projecting portion of the rotor to limit a range of rotation of the rotor and limit a range of movement of the driven members; a light quantity sensor for detecting a quantity of light passing through the aperture; and a control unit for changing the amount of opening of the aperture by controlling the ultrasonic motor in accordance with the quantity of light detected by the light quantity sensor.

21. A drive mechanism according to claim 20; wherein the drive mechanism comprises one of an aperture mechanism for light quantity control or a shutter mechanism.

22. A drive mechanism comprising: an ultrasonic motor having a rotor which is rotationally driven by vibration of a vibrating member having a piezoelectric element, the rotor having a projecting portion for rotation therewith; at least one driven member connected to the projecting portion of the rotor for undergoing movement along a surface extending in a radial direction of the rotor; a guide member for restricting movement of the driven member and for guiding movement of the driven member in a given direction; rotation amount detection means for detecting an amount of rotation of the rotor; and a control unit for controlling the ultrasonic motor in accordance with the rotation amount detected by the rotation amount detection means.

* * * * *